A. E. SMITH.
Attaching Hubs to Axles.
No. 16,499.
Patented Jan. 27, 1857
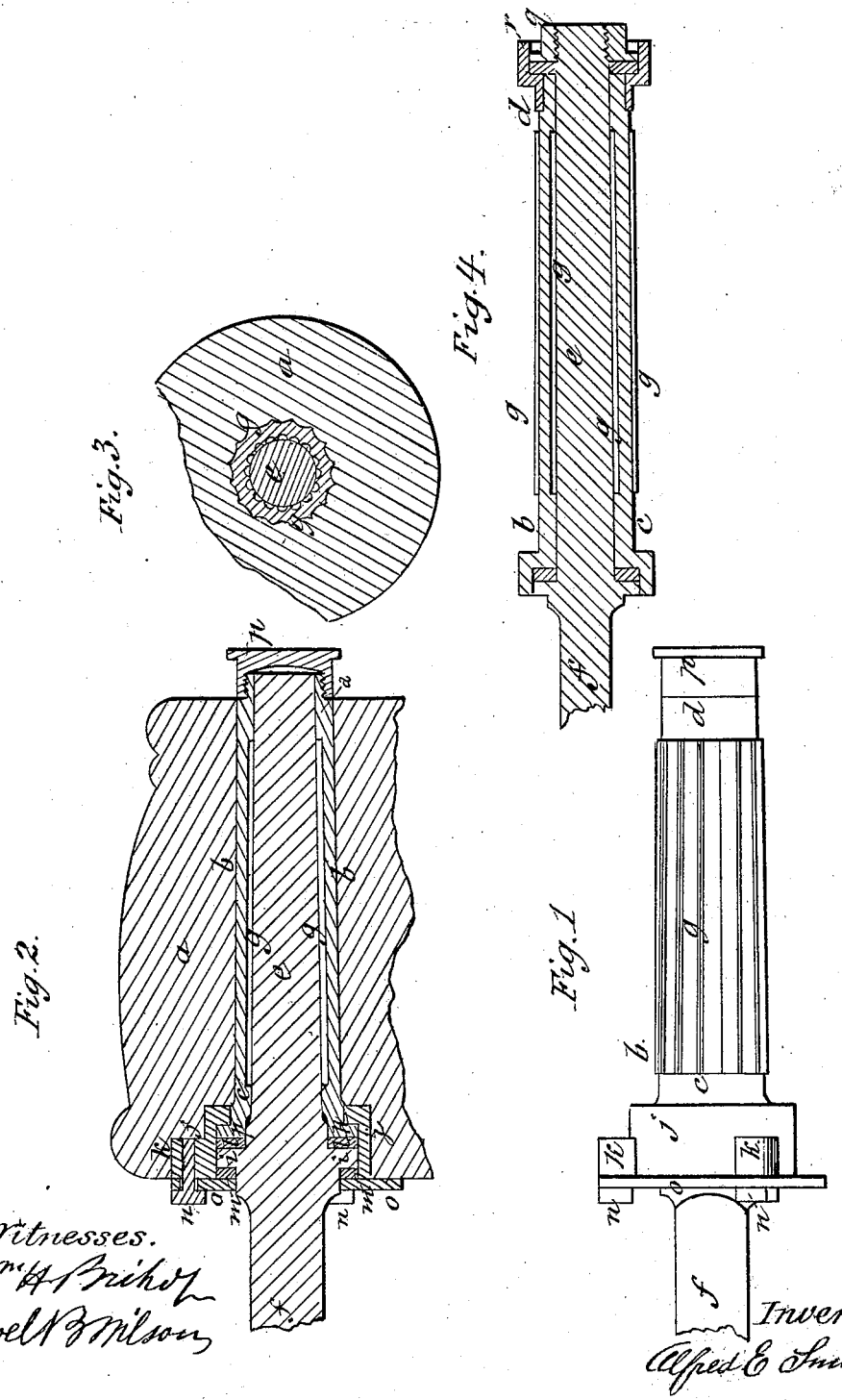

UNITED STATES PATENT OFFICE.

ALFRED E. SMITH, OF BRONXVILLE, NEW YORK.

AXLE-BOX.

Specification of Letters Patent No. 16,499, dated January 27, 1857.

*To all whom it may concern:*

Be it known that I, ALFRED E. SMITH, of Bronxville, Westchester county, and State of New York, have invented new and useful Improvements in Pipe Boxes for Carriage-Wheel Hubs and in the Method of Securing the Same on Axles, reference being had to the accompanying drawing, making part of this specification, in which—

Figure 1 is an elevation or external view of the pipe box out of the hub; Fig. 2 a longitudinal section of the same within the hub; Fig. 3 a cross section thereof; and Fig. 4 a longitudinal section of a modification of my said invention.

The same letters indicate like parts in all the figures.

The nature of my invention consists in making pipe boxes for carriage wheel hubs with a section at each end cylindrical, if the arm of the axle be cylindrical, or conical, if the arm of the axle be conical, when these sections are connected and combined with the intermediate part made with corrugations or flutes running in the direction of the length both inside and outside, for the three fold purpose of giving greater strength with a given weight of metal, to form a series of longitudinal oil cells inside all around the arm of the axle, and to form ribs all around on the outside to enter the wood when driven in that may be effectually held and bound in the hub.

In the accompanying drawings (*a*) represents the hub which is driven onto a metallic pipe box (*b*). The bore of this pipe box at the two ends (*c*) and (*d*) is made to fit the arm (*e*) of the axle (*f*) accurately, but so that it will turn thereon freely. Between the ends (*c*) and (*d*) the pipe box is corrugated or flutted so as to leave the ribs and flutes (*g*) longitudinal, with the edges of the ribs inside to fit the arm of the axle, the grooves or flutes forming oil cells all around the arm of the axle to keep and distribute the oil all around. The longitudinal ribs formed by the corrugations on the outside will enter the wood of the hub when it is driven onto the pipe box, which will have the effect thoroughly to bind and hold the pipe box within the hub. The inner end (*c*) of the pipe box is formed with a projecting flanch (*h*) of equal diameter with a collar (*i*) on the axle at the inner edge of the arm (*e*).

The inner end of the hub is cut out to fit a metallic collar (*j*) which is driven into this cavity, the collar being formed with projecting spurs (*k*) which aid in holding the collar within the cavity of the hub; but the collar may be otherwise secured on the end of the hub. The bore of the collar fits the outer diameter of the pipe box and its inner face is bored out to extend over the flanch (*h*) and the collar (*i*) on the axle, and leather washers (*l, m*) one on each side of the collar (*i*). The collar (*j*) is provided with three (more or less) turn buttons or hold fasts (*w, w, w,*) tapped into it and with flat projecting heads which pass through holes in a ring (*o*) fitted to turn freely on the axle beyond the collar (*i*) and with the leather washer (*m*) interposed between.

After the hub has been secured on the pipe box and slipped onto the axle the ring (*o*) is slipped over the head of the turn buttons which are then turned so that their projecting heads shall pass over the surface of the ring thereby firmly securing the ring (*o*) to the collar (*j*) and embracing the collar (*i*) on the axle, thereby securing the pipe box and hub on the axle in such a way that they cannot get off by accident, although they can be readily put on and taken off. Catches or keys may be substituted for the turn buttons, although I prefer the turn buttons for the reason that in turning them to disconnect the parts they unscrew to free the parts, and in securing the ring to the collar they are screwed in to draw the parts firmly together to prevent all rattling; an important result in all vehicles. After the hub has been driven onto the pipe box, the outer end can be further secured by screwing a metallic ring (*p*) onto the end (*d*) of the pipe box; or this ring may be driven onto the end of the pipe box instead of being screwed on. And however this be done the ring may be closed or open at the end, and when opened it is to be provided with a cap screw (*q*), see Fig. 4, inclosing a leather washer (*r*) which bears against the end of the arm of the axle to aid the washers at the other end in keeping the oil, excluding dust, and resisting the end play and the wear consequent thereon.

The pipe box may be cast of the form required, or it may be made of sheet metal rolled with the corrugations and the two parts (*c, d*) at the ends, by having rollers suitably fitted and mounted for that purpose. In this way the pipe box can be made of the required strength and lighter than by casting. But when made of sheet metal thus rolled and bent around and united, the flanch on the inner end must be put on which can be done by fitting thereon a short tube with the projecting flanch.

What I claim as my invention and desire to secure by Letters Patent is—

Making metallic pipe boxes for carriage wheel hubs with the two ends cylindrical or conical to fit the arm of the axle, when these two sections are connected and combined with the intermediate part corrugated or fluted inside and outisde, substantially as described, for the three fold purpose of giving greater strength with a given weight of metal; to form a series of longitudinal oil cells all around the arm of the axle; and to form longitudinal ribs all around on the outisde to enter the wood when driven in, that it may be effectually held and bound in the hub, substantially as set forth.

ALFRED E. SMITH.

Witnesses:
Wm. H. Bishop,
Peter T. Marseils.